United States Patent [19]

Davidson

[11] Patent Number: 5,282,088
[45] Date of Patent: Jan. 25, 1994

[54] APLANATIC MICROLENS AND METHOD FOR MAKING SAME

[76] Inventor: Mark Davidson, 807 Rorke Way, Palo Alto, Calif. 94303

[21] Appl. No.: 963,064

[22] Filed: Oct. 19, 1992

[51] Int. Cl.$^5$ .......................... G02B 3/00; G02B 6/32
[52] U.S. Cl. .................................... 359/664; 359/642; 385/35
[58] Field of Search ................... 359/664, 642; 385/35

[56] References Cited

U.S. PATENT DOCUMENTS

| | | | |
|---|---|---|---|
| 4,118,270 | 10/1978 | Pan et al. | 156/659 |
| 4,354,734 | 10/1982 | Nakahashi | 359/664 |
| 4,557,566 | 12/1985 | Kikuchi et al. | 359/664 |
| 5,083,223 | 1/1992 | Igarashi | 359/664 |

OTHER PUBLICATIONS

"SMILE Spherical Micro Integrated Lenses", Fotoform Products Group, Corning Incorporated, MP 21—3-5, Corning, N.Y., (3 pages).

Primary Examiner—Scott J. Sugarman
Attorney, Agent, or Firm—Claude A. S. Hamrick

[57] ABSTRACT

An aplanatic microlens consisting of a sphere which is less than one millimeters in diameter. The sphere is made of a transparent material and has a plane surface ground into it so that the radial distance from the center of the sphere to the nearest point on the plane surface is equal to the radius of the sphere divided by the ratio of the index of refraction of the transparent material and the index of refraction of the medium which will surround the lens in use.

10 Claims, 7 Drawing Sheets

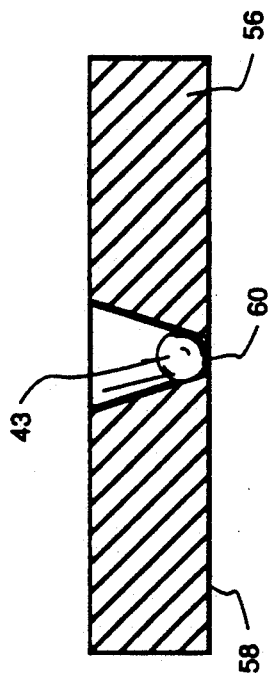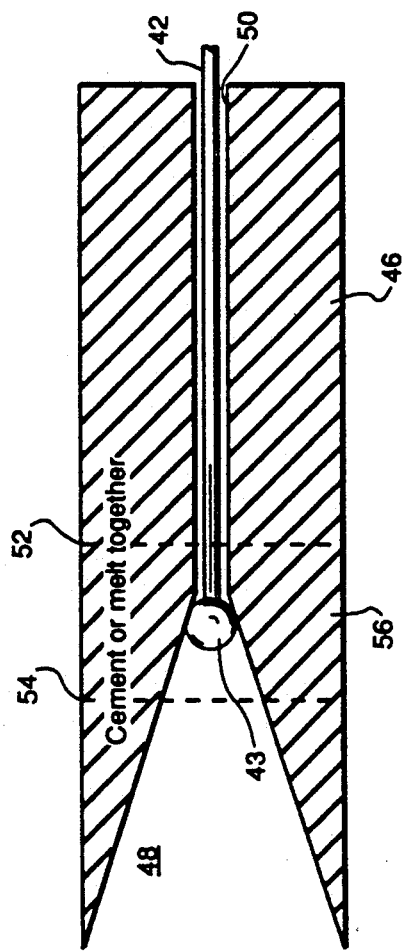

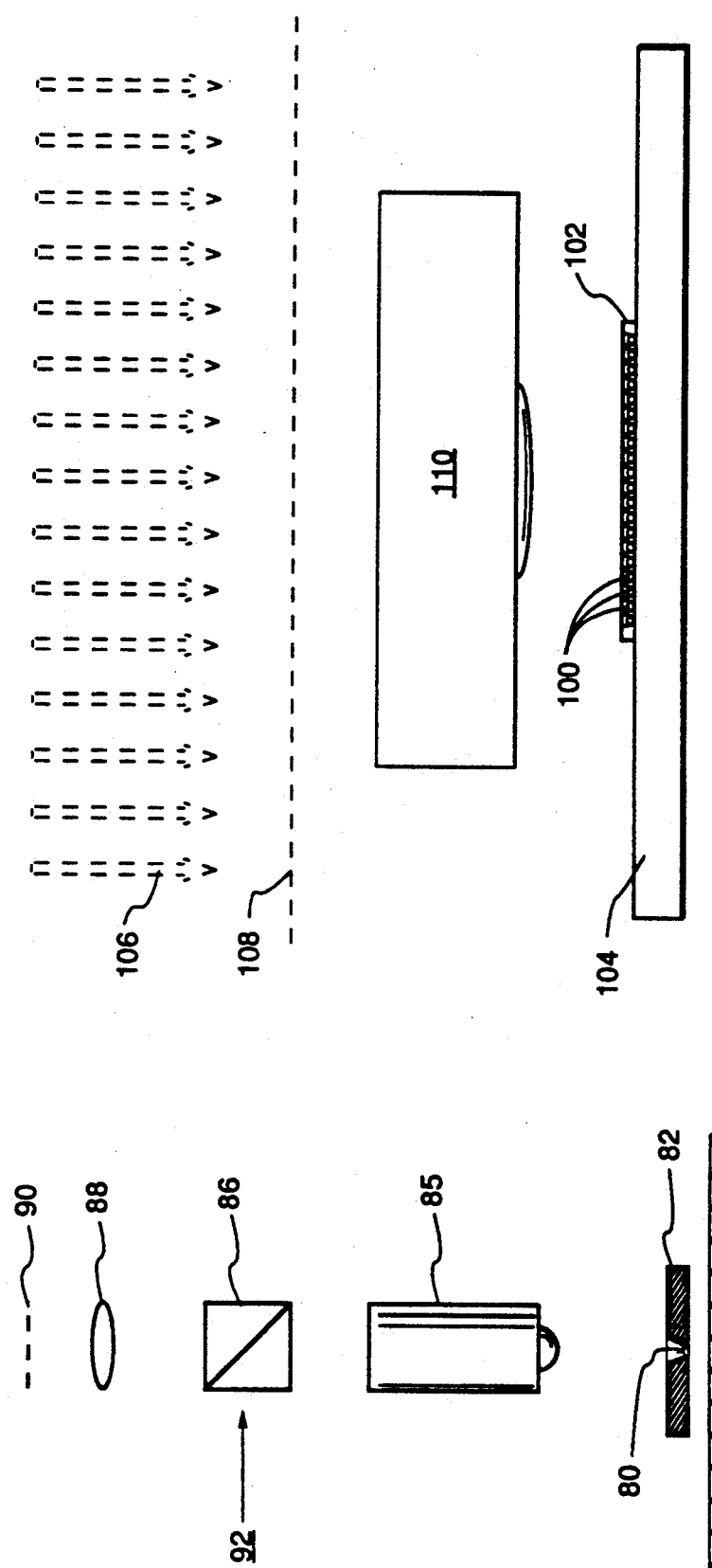

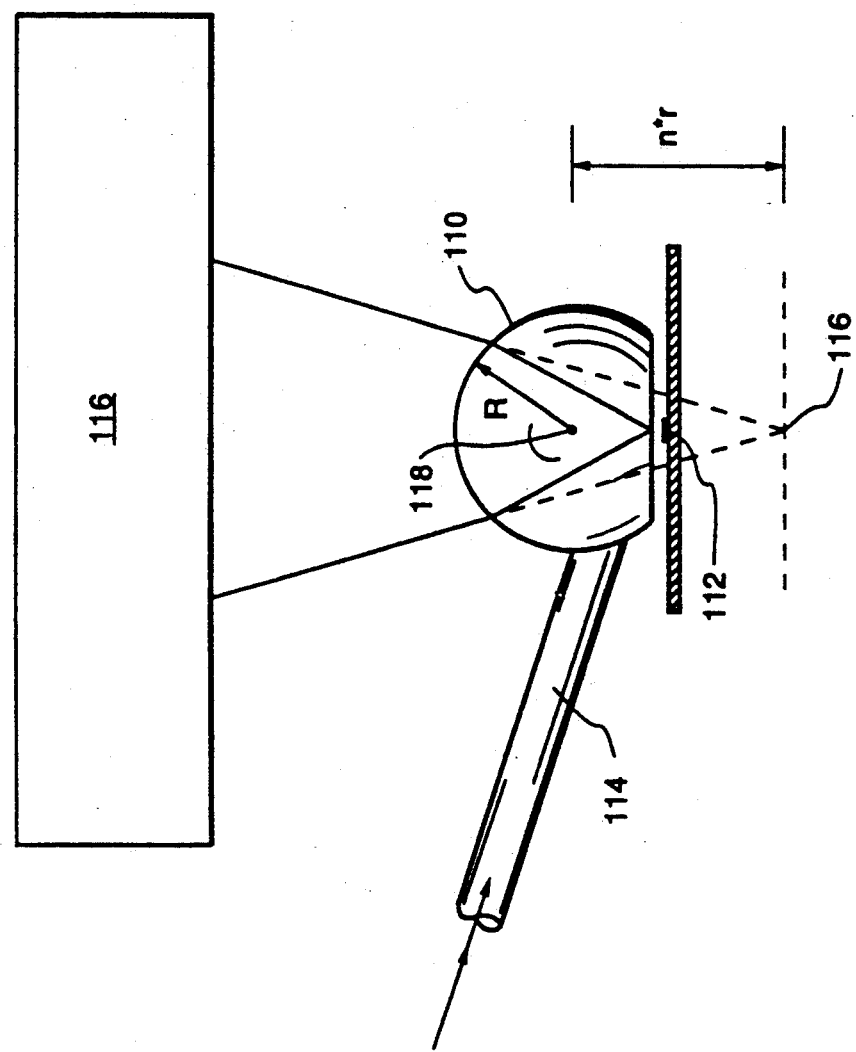

APLANATIC MICROLENS AND METHOD FOR MAKING SAME

BACKGROUND OF THE INVENTION

1. Field of the Invention

This invention relates to lenses and optical systems and, more particularly, to an aplanatic microlens and a method for making such a lens.

2. Brief Description of the Art

As the geometries of integrated circuits and other micro components have become smaller and smaller, a need for higher resolution optical instruments, and particularly lenses, has arisen. To meet this need, the optics industry has responded by designing and manufacturing lenses which are most effective for light of wavelengths in the deep ultraviolet.

The lenses so manufactured have been made using traditional lens making techniques and have, for the most part, led to unsatisfactory results in lenses with high numerical apertures for the following reasons:

(i) multi-element lenses (typically 10 or more) are much more sensitive to scratches, misalignment, and fabrication errors than lenses which are designed for visible light;

(ii) anti-reflection coatings ar difficult to fabricate for ultraviolet light wavelengths;

(iii) as a result of unavoidable differences in manufactured lenses, two lenses of the same design tend to show marked differences in imaging; and (iv) the lenses, though faulty, are extremely expensive to custom manufacture.

More specifically, in the semiconductor industry there are two major dimensional metrology tasks: the line width or critical dimension measurement; and layer-to-layer overlay measurement. As there are a number of accuracy problems relating to optical critical dimension measurement, this measuring task has traditionally been performed by means of an electron microscope. However, electron microscopes cannot form images through transparent films and therefore optics must be used for many overlay measurements.

Furthermore, unless additional process steps are added to clear a hole in the transparent layer, electron beam imaging cannot be used to measure layer-to-layer overlay accuracy where the overlay target is buried beneath a transparent layer.

Unfortunately, today's optics can, as a rule of thumb, only be used to measure down to about 0.8 micrometers line widths; a restriction which makes today's optical instruments inadequate for line width and layer-to-layer overlay measurements required in state of the art semiconductor technologies. But if a lens existed which could operate in wavelengths in the deep ultraviolet (using a laser of around 200 nanometers wavelength), then it is conceivable that optical instruments can be used to measure line widths to below 0.4 micrometers. If a lens of this nature existed, it could also be used for defect inspection.

Finally, a new technology called phase shifting mask lithography has increased a need for good optical metrology in the semiconductor industry because the optical thickness of the small lines must be measured as well as their critical dimensions. So, high quality optical lenses which are highly reproducible are desired.

There is therefore a need, particularly for purposes of inspection and measurement in semiconductor fabrication operations, for a highly reproducible and simple lens which can operate in wavelengths in the deep ultraviolet.

SUMMARY OF THE INVENTION

Objects of the Invention

It is therefore an object of this invention to provide for a highly reproducible and simple lens which has no, or negligible, spherical aberrations.

It is yet another object of this invention to provide a lens with as little area of glass as possible.

It is still a further object of this invention to provide a lens which can operate in wavelengths in the deep ultraviolet using a laser of about 200 nanometers wavelength.

Summary

Briefly, according to a preferred embodiment of this invention, an aplanatic microlens consists of a sphere which is typically less than one millimeter in diameter. The sphere is made of a transparent material and has a plane surface formed in it so that the radial distance from the center of the sphere to the nearest point on the plane surface is substantially equal to the radius of the sphere divided by the ratio of the index of refraction of the transparent material and the index of refraction of the medium which will surround the lens in use.

The lens of the invention is manufactured by heating the tip of an optical fiber until a molten globule forms at the tip. As the dimensions of the globule are small, the ratio of the surface tension of the molten material to the gravitational forces the globule into a perfectly spherical shape. Once this has hardened, the plane surface can be ground into the sphere and any resulting scratches in the plane surface can be removed by means of a fire polishing process.

Advantages of the Invention

A primary advantage of the microlens of this invention is that it forms an aplanatic lens which displays small aberrations on or near its axis.

A second advantage of the microlens of the invention is that it is formed with the use of natural surface tension effects and therefore polishing of the curved surfaces are largely eliminated.

Yet another advantage of the lens of the invention is that its chromatic aberrations are much smaller than a standard lens and thus a high pressure arc lamp is usable as an illumination source. If the lens is made from fused silica, then it is transparent down to about 180 nanometers wavelength.

Still further advantage of the lens is that it is possible to combine it with other similar lenses to form an array of microlenses which allows for parallel processing for a number of inspection applications.

These and other objects and advantages of the present invention will no doubt become apparent to those skilled in the art after having read the following detailed description of the preferred embodiment which is illustrated in the several figures of the drawing.

DESCRIPTION OF THE DRAWINGS

In the accompanying drawings:

FIGS. 5(a) and (b) illustrate an alternative method of manufacturing the lens;

FIG. 7 illustrates the use of the lens of the invention together with a conventional microscope;

FIG. 8 illustrates the use of the lens of the invention in a photo lithographic process; and FIG. 9 illustrates how the lens can be held on a stalk and how an object can be illuminated using the lens of the invention.

DESCRIPTION OF EMBODIMENTS

Background Theory

Before proceeding with a description of the basic theory on which the lens of this invention is based, it should be noted that an aplanatic lens is a lens which is corrected for spherical aberrations and coma and that aplanatic points are two points which are positioned with respect to one another so that all rays emanating from one of the points converge to, or appear to diverge from, the other.

Figure 1:
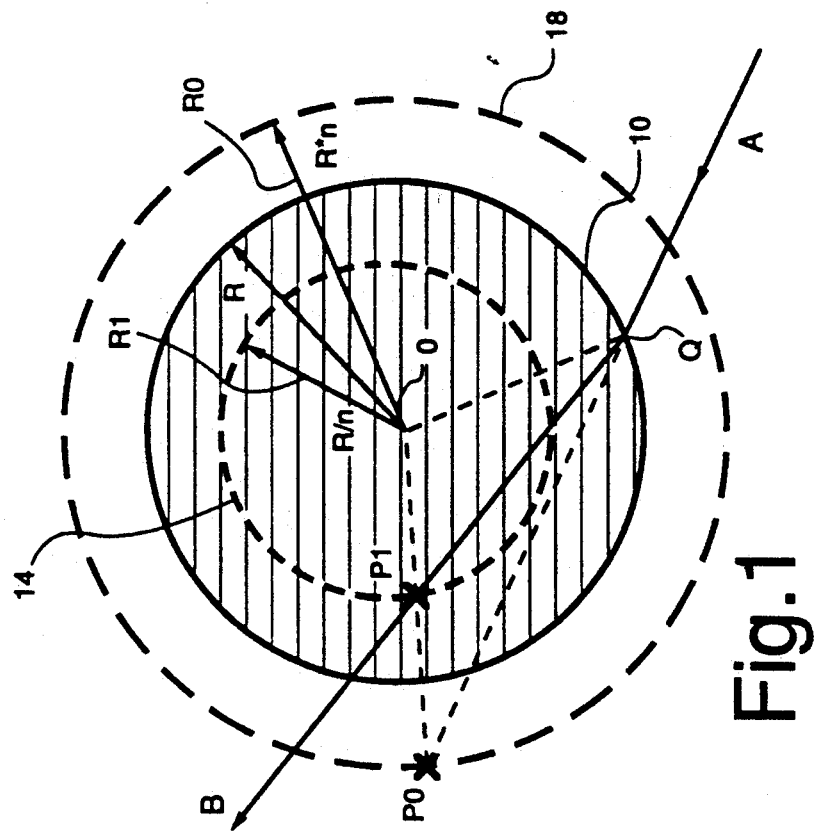
FIG. 1 is a graphical representation illustrating the theory of the invention.

This basic theory of the lens of the invention is illustrated in FIG. 1 which shows a solid homogeneous sphere 10, embedded in an homogeneous medium, with O as the center of the sphere, R its radius, and n the quotient of the refractive index of the sphere divided by that of the surrounding medium. A ray AQ is incident upon the sphere and is refracted as ray QB which can be determined by means of the following construction:

Let 14 and 18 designate two spheres whose centers are at O and whose respective radii are $$R_1 = R/n$$

$$R_0 = n \cdot R$$

If $P_0$ is the point of intersection of the extension of ray AQ with sphere 18, and $P_1$ is the point at which $OP_0$ meets sphere 14, then the following construction applies to define $QP_1$:

$$\frac{OQ}{OP_0} = \frac{R}{R \cdot n} = \frac{1}{n} \text{ and } \frac{OP_1}{OQ} = \frac{R/n}{R} = \frac{1}{n}$$

therefore, $$\frac{OQ}{OP_0} = \frac{OP_1}{OQ}$$

It follows that, as $Q\hat{o}P_0 = Q\hat{o}P_1$ the triangles $OQP_0$ and $OP_1Q$ are similar, and consequently, from the sine rule:

$$\frac{\sin \phi_0}{\sin \phi_1} = \frac{OP_0}{OQ} = n \quad (1)$$

where $\phi_0 = O\hat{Q}P_0$ and $\phi_1 = O\hat{Q}P_1$ are the angles of incidence and refraction respectively. As $\phi_0$ and $\phi_1$ satisfy the law of refraction, $QP_1$ is the refracted ray.

The above construction implies that all rays which diverge from a point $P_1$ on sphere 18 will form a virtual stigmatic image at the point $P_0$ at which the radius $OP_0$ intersects the sphere 14. Hence the sphere 18 is a stigmatic image of the sphere 14 and vice versa. In accordance with the standard terminology described above, points $P_0$ and $P_1$ are called aplanatic points of the spherical surface 10.

As is described below, it is the existence of such aplanatic points for refraction at a spherical surface that is made use of in the construction of the aplanatic microlens of this invention.

Lens Geometry

Figure 2:
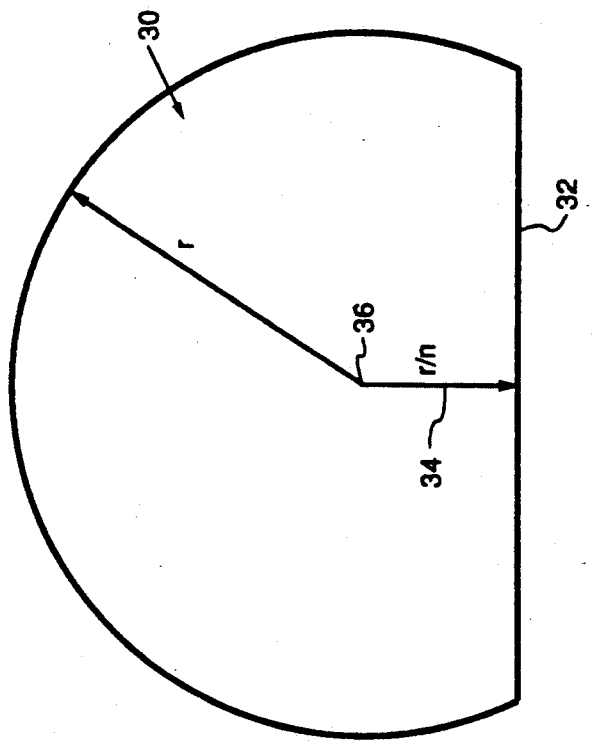
FIG. 2 is a schematic representation of an aplanatic microlens of the invention.

The geometry of the aplanatic microlens of the invention is illustrated in FIG. 2. In this figure a sphere, generally indicated as 30, made of a transparent material of known refractive index is illustrated. The sphere 30 operates in a medium, typically air, also of known refractive index, so that a value n can be defined where n is equal to the index of refraction of the transparent material divided by the index of refraction of the medium surrounding the sphere 30. As shown, the sphere 30 has a radius r, typically less than 1.0 millimeter, and has a flat planar surface 32 formed therein. As indicated by the dimension 34 the perpendicular distance from the center of the sphere to the planar surface 32 is r/n, where r is the radius and n is as defined above.

Figure 3:
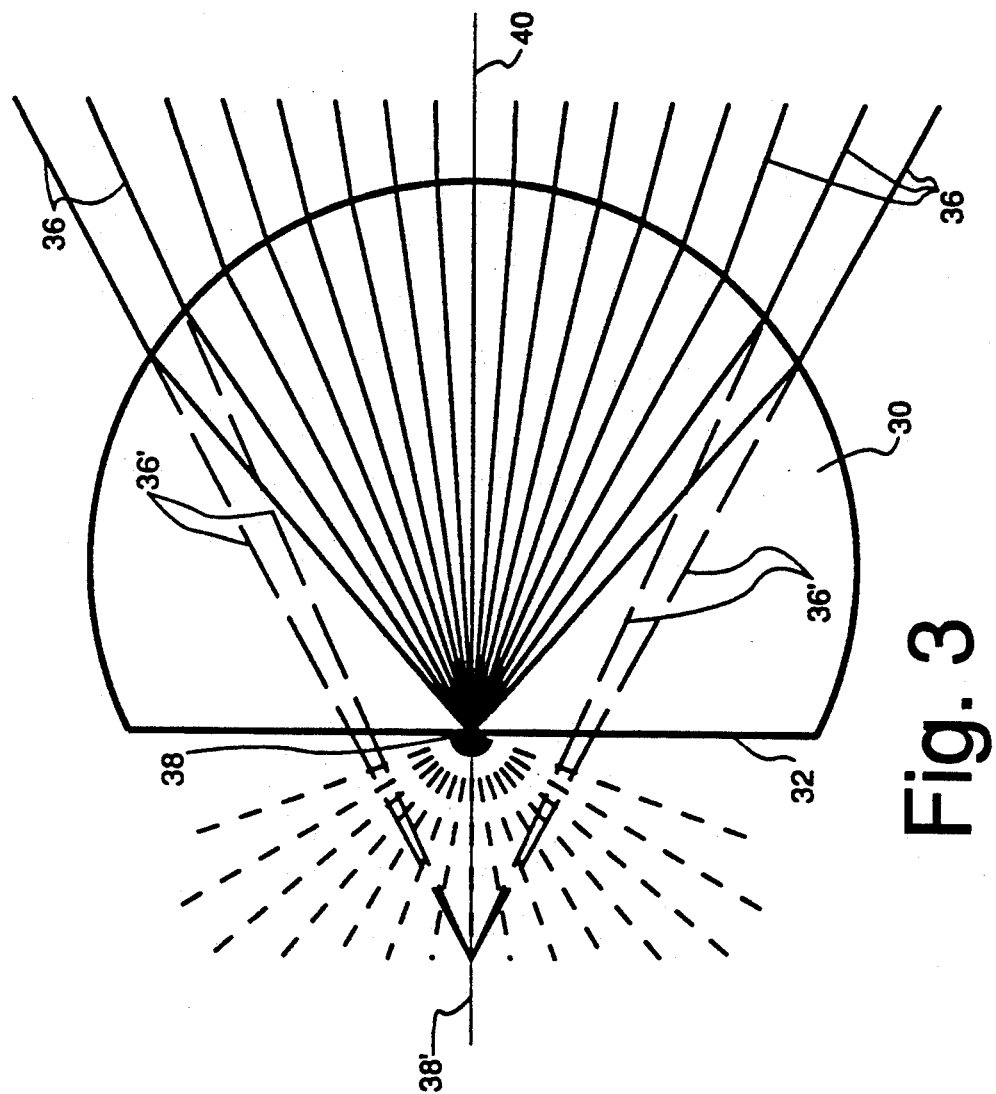
FIG. 3 is a plan view showing how the lens in FIG. 2 forms an image.

This basic geometry forms an aplanatic lens which forms an image as illustrated in FIG. 3. In this figure, a number of rays 36 are shown emanating from a point 38 where the axis 40 of the lens intersects the planar surface 32. The rays 36 diverging from the point 38 on the planar surface 32 are arranged symmetrically about the axis 40 and exhibit no aberrations with respect to this axis 40. If these rays are traced back, as illustrated by the broken lines 36', it can be seen that they all intersect at a single point 38' on the axis 40 of the lens. This point 38' is a distance r*n from the center of sphere forming the lens 30 and thus the construction accords with the description of an aplanatic lens above. Accordingly points 38 and 38' can be termed aplanatic points. Point 38 also represents the focal point of the lens 30.

In practice, therefore, if the lens 30 is placed directly onto an object to be imaged, an aplanatic virtual image of the object will be formed at a distance r*n from the center of the lens.

Furthermore, as will be apparent to anyone skilled in the art, the lens 30 can be used to view an object which is slightly spaced away from the planar surface 32. In this case, the virtual image will be slightly more than r*n from the center of the lens and some aberrations will be introduced. These will, however, be so small that they can be ignored if the microlens is small enough.

Manufacture of the Lens

One method of manufacturing the microlens 30 described above is illustrated in FIGS. 4(a) and (b). As a first step, a suitable optical fiber 42, typically made from fused silica ($SiO_2$), is selected. The reason for starting with an optical fiber is that it is naturally a near perfect cylinder, a configuration which results from the drawing process which is used in the fabrication of optical fibers, and so the process described below can be accomplished easier.

The tip of the fiber 42 is cleaned, polished and thereafter heated uniformly to form a molten globule 43 at the tip. Another method of forming a globule at the tip of an optical fiber is illustrated in U.S. Pat. No. 4,118,270 in the name of Pan et al.

When the molten globule forms, the surface tension of the liquid silica forms the molten globule into a near perfect sphere. This is because the dimensions of the globule are small, so that ratio of the surface tension of the molten material to the gravitational forces forms the globule into a perfectly spherical shape. In addition, it is believed that other forces work together with the surface tension to form the spherical shape. It follows from this that the smaller the size of the fiber 42, the smaller the molten globule formed and the stronger the effects of the surface tension and therefore the more perfect the spherical shape formed. Using this method, a spherical globule substantially smaller than 1 millimeter can be formed.

Once the spherical globule 43 is formed at the tip of the optical fiber 42, it is allowed to harden. The surface of this sphere 43 need not be polished as it is free from any aberrations. This is because no mechanical polishing operation has been performed, and so the sphere's surface is almost scratch-free. The resultant configuration is illustrated in FIG. 4(a) Where the spherical globule/lens 43 is shown formed at the end of an optical fiber 42.

Figure 4B:
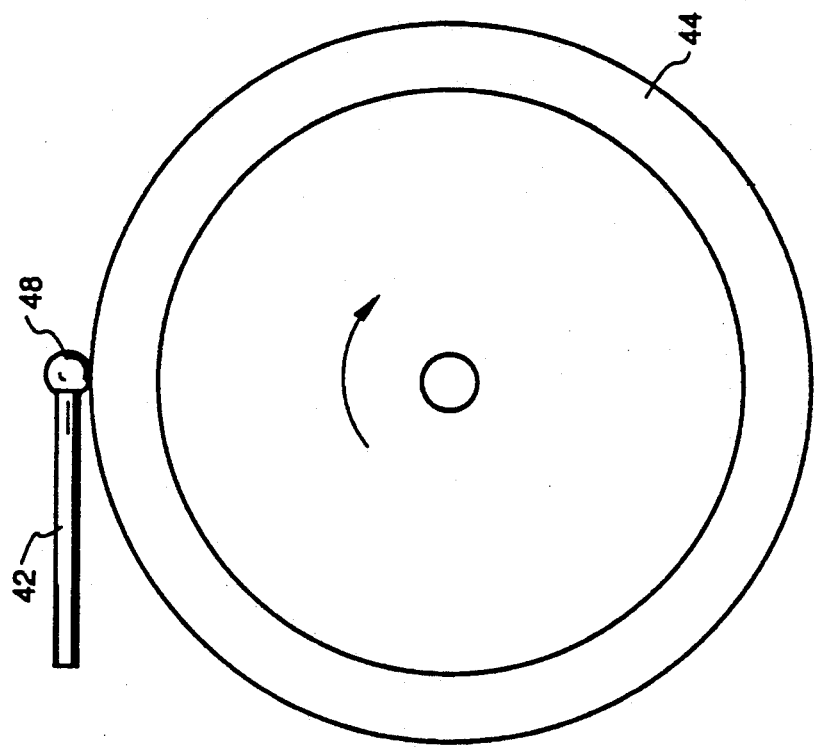
FIGS. 4(a) and (b) illustrate a method of manufacture of the lens in FIG. 2.
Figure 4A:
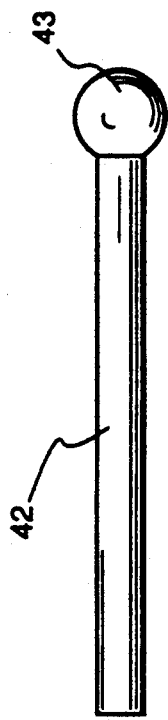

This spherical lens 43 is then ground on a grinding wheel 44, a process Which is illustrated in FIG. 4(b). This grinding forms the planar surface, in the lens 43, at a point defined by the product of the radius of the sphere and the ratio of refractive indices as described above. This planar surface is then fire polished to remove any scratches which were caused by the grinding wheel 44.

Another method of forming the aplanatic lens of the invention is illustrated in FIGS. 5(a) and (b). A spherical lens 43 is formed at the tip of an optical fiber 42 by means of a process similar to that described above. Once the spherical lens 43 has been formed at the end of the optical fiber 42 the combination is fitted into a conical lens mounting structure 46. This lens mounting structure 46 consists of a block of material with a conical funnel 48 formed part of the way into the mounting structure 46. The funnel 48 terminates in a channel 50 formed through the remainder of the mounting structure 46. As is illustrated in FIG. 5(a) the spherical lens 40 is wedged in the base of the funnel 48 so that the optical fiber 42 passes along and through the channel 50. Once this is done the lens 4 is fixed into the base of the funnel 48 by either cementing it into place or applying heat to cause the lens and the mounting structure 46 to melt together.

Thereafter, the mounting structure 46 is cut along lines 52 and 54 to form a cutout portion 56 similar to that illustrated in FIG. 5(b). This cutout portion 56 is then ground down from one side 58 until a suitably dimensioned flat face 60 is formed in the spherical lens 43.

This manner of forming the lens has the advantage that accurate machining of the flat face 60 can be performed as well as providing a method of accurately mounting the lens 43 into the cutout portion 56. This cutout portion 56 can also be used to manipulate and position the lens 43 during optical inspection and other uses.

Figure 6B:
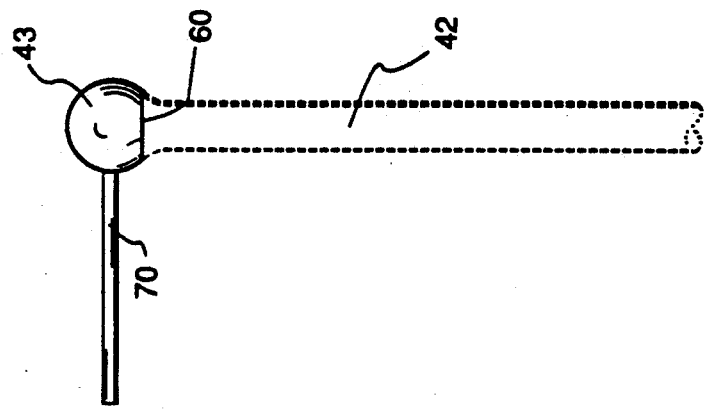
FIGS. 6(a) and (b) illustrate yet another method of manufacturing the lens.
Figure 6A:
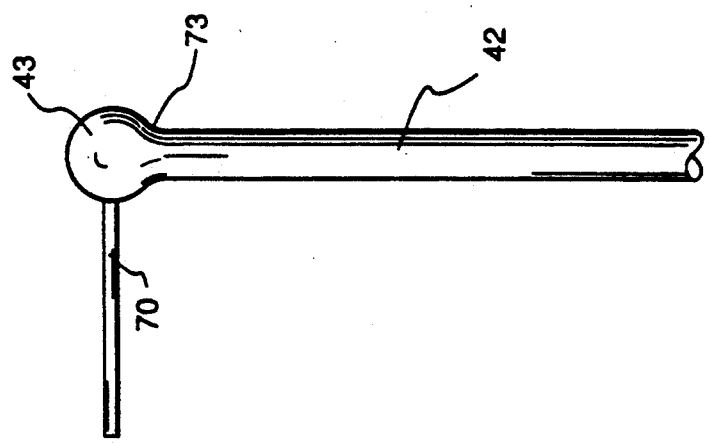

Yet another method of manufacturing the lens is illustrated in FIG. 6(a) and 6(b). In FIG. 6(a) the lens 43 is shown formed at the end of the optical fiber 42 in a manner similar to that described above. Thereafter a stalk 70 is secured to the side of the lens 40 by heating the lens and/or the stalk and bringing the two into contact with one another to cause them to weld together.

Once this has been accomplished, the optical fiber 42 can be removed and the flat surface 60 ground into the lens as illustrated by FIG. 6(b). The stalk 70 can be used to assist in handling the lens 43 during the grinding process and can later be used to position the lens in imaging operations.

One of the reasons for removing the optical fiber 42 and replacing it with a stalk 70 is that the lens 43 loses its spherical shape at the neck 73 where the fiber 42 intersects the lens 43. In removing the fiber 42, by forming the planar face 60 in the vicinity of the intersection between the lens 43 and fiber 42, the non-spherical neck 73 is removed. The lens 43 remaining is, apart from the planar face 60, as close to a sphere as possible.

Another reason for removing the optical fiber 42 is that it can be replaced by a stalk 70 of a more convenient diameter.

Use of the Aplanatic Microlens

One possible use of the aplanatic microlens of the invention is illustrated in FIG. 7. In this figure the microlens 80, of a configuration as described above, is shown to be supported in a support 82 above an object 84. A conventional low numerical aperture microscope objective lens 85 is located above the microlens 80. A beam splitter 86 and a further lens 88 combine to form the optical system which forms an image onto an image plane 90. In addition, illumination is provided through the beam splitter 86, objective lens 85 and microlens 80 to the object 84. The illumination is provided from a suitable illumination source 92.

As is illustrated, the flat surface of the microlens 80 is close (20 micrometers or less) to the object 84. It is even possible for the flat face of the microlens 80 to rest directly on the object 84. The image which is formed on the image plane 90 is formed, in part by the microlens 80, as if the microlens 80 were a magnifying glass. By moving the microlens 80 around using the mounting 82, an enlargement or magnification of any area, of the object 84, within the field of the low resolution objective lens 85 can be achieved.

If the microlens 80 actually touches the specimen then it can function as a near field microscope with enhanced resolution because the evanescent rays are captured and imaged by the microlens 80. Furthermore, the microlens 80 can be scanned and used in either a step and repeat mode or used on-axis in a pure scanning mode. As the microlens 80 is particularly small it weighs very little and it makes scanning much easier than the conventional microscope objective lens.

Another use for the microlens of the invention is illustrated in FIG. 8 in which an array of microlenses 100 are shown mounted in an array mount 102. In this figure the array of microlenses is used in a photo lithographic process. Illumination of a substrate 104 is provided from an illumination source 106 which passes through a photomask pattern 108. This illumination source is then imaged through an imaging lens system 110 which, in turn, focuses light from the illumination source 106 onto a single microlens 100 or a small group of microlenses. These microlenses 100, in turn, focus the light directly onto the substrate 104.

Since a single microlens can image a pattern over a field size which is only a fraction of its area, a microlens array cannot give 100% coverage in a lithographic application with a single exposure. Rather, a microlens array will produce an array of small images, with the spacing of the microlenses determining the spacing of the small images. A 100% coverage can be achieved with multiple exposures, however, by stepping the substrate 104 or moving the microlens array mount 102 and piecing together the exposures to expose the entire area. The stepping would be done so that the union of all the small image areas over the multiple exposures would equal the entire area to be exposed.

As the photomask pattern must be changes for each exposure, so as to expose the appropriate pattern for the position of the small images, a means for changing the photomask pattern 108 quickly would have to be developed. In this way, a high resolution photolithographic process can be developed.

Yet another application of the microlens of the invention is illustrated in FIG. 9. In this figure a microlens 110 is shown to be supported over an object 112. A source of light (not shown) feeds light along an optical fiber stalk 114 from which the lens 110 was formed or which was secured to the lens 110 as was illustrated in FIGS. 6(a) and (b).

The light passes down the optical fiber 114 and serves to illuminate the object 112. This illuminated object 112 can then be viewed with an optical instrument of which only the objective lens 116 is illustrated. This illuminated object 112 forms a substantially better image (a virtual image at point 116) as a result of the illumination. Such illumination can be achieved by the use of visible, ultraviolet or infrared light. As the lens' chromatic aberrations are much smaller than a standard lens, a high pressure arc lamp can be used as an illumination source. More specifically, if the lens is made from fused silica, then it is transparent down to about 180 nanometers wavelength.

Finally, it should be noted that the virtual image formed is formed, at the virtual image plane 116, at a distance equal to r*n from the center 118 of the lens 110.

Although the present invention has been described above in terms of specific embodiments, it is anticipated that alterations and modifications thereof will no doubt become apparent to those skilled in the art. For example, the lens has been indicated as having a radius of less than 1.0 millimeter. It is, however, envisaged that a lens of, say, 10 millimeters or more could be constructed with the novel features described. It is therefore intended that the following claims be interpreted as covering all such alterations and modifications as fall within the true spirit and scope of the invention.

What is claimed is:

1. An aplanatic microlens comprising:
   a sphere formed of a transparent material; and
   a planar surface formed in the sphere, wherein the radial distance, from the center of the sphere to the nearest point on the planar surface, is substantially equal to the radius of the sphere divided by the quotient of the index of refraction of the transparent material divided by the index of refraction of the medium which will surround the microlens in use.

2. An aplanatic microlens as recited in claim 1 wherein the radius of the lens is less than ten millimeters.

3. An aplanatic microlens as recited in claim 2 wherein the radius of the lens is less than 1.0 millimeter.

4. An aplanatic microlens as recited in claim 2 further comprising a stalk mounted to the spherical portion of the microlens such that the stalk can be used as a handle to position the microlens.

5. An aplanatic microlens as recited in claim 4, wherein the stalk is an optical fiber and can be used to guide light, from a light source, into the microlens.

6. An aplanatic microlens as recited in claim 2, wherein the transparent material is silica.

7. An optical system having a definable optical axis and comprising:
   at least one aplanatic microlens on the optical axis including a sphere of transparent material with a planar surface formed in the sphere such that the radial distance from the center of the sphere to the nearest point on the planar surface is substantially equal to the radius of the sphere divided by the quotient of the index of refraction of the transparent material divided by the index of refraction of the medium which will surround the lens in use; and
   an objective lens arranged on the optical axis and spaced from said microlens such that, in use, the objective lens will form a virtual image at an image plane which is a distance n*r from the center of said microlens, where r is the radius of said sphere and n is the ratio of the index of refraction of the transparent material and the index of refraction of the medium which will surround the lens in use.

8. An optical system as recited in claim 7 further comprising a plurality of said microlenses arranged and mounted to form an ordered array of lenses.

9. An optical system as recited in claim 7, wherein said microlens includes a stalk mounted to the spherical portion of the microlens such that the stalk can be used as a handle to position the microlens.

10. An optical system as recited in claim 9 wherein the stalk is an optical fiber, the system further comprising:
   a light source positioned with respect to the optical fiber such that light from the light source passes down the optical fiber and into the sphere to illuminate an object being viewed.

* * * * *